July 29, 1969     P. H. KYDD     3,457,619
PRODUCTION OF PERFORATED METALLIC BODIES
Filed Nov. 28, 1967
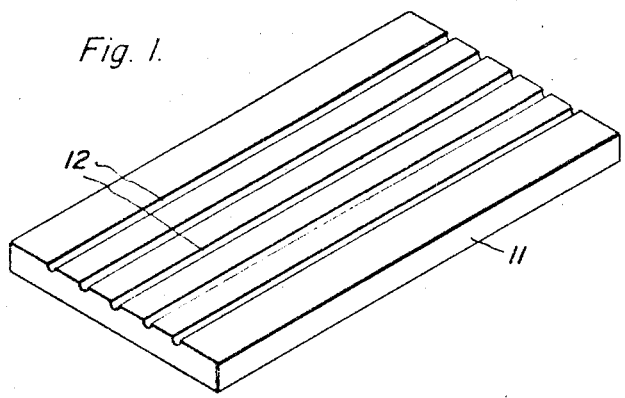
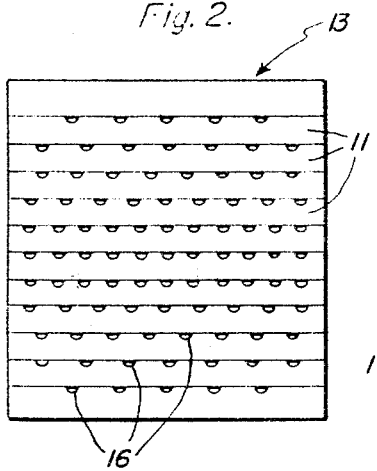
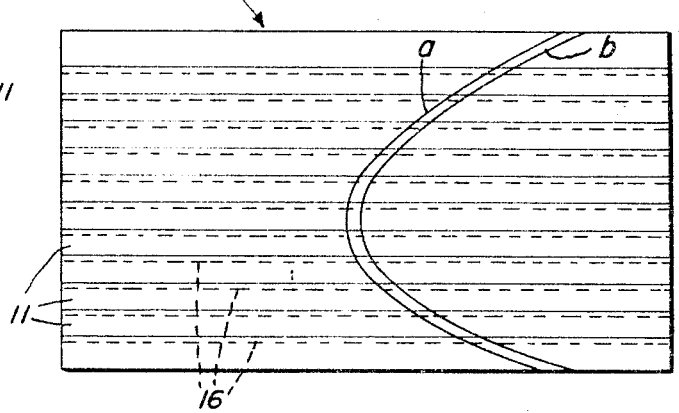
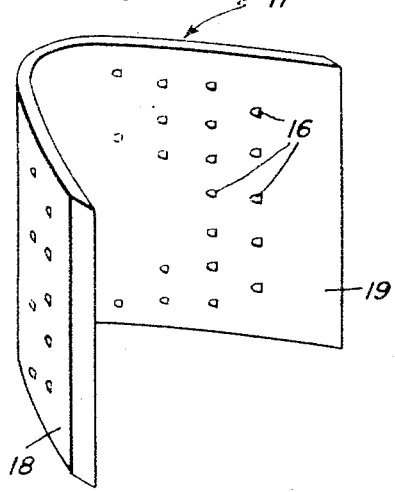
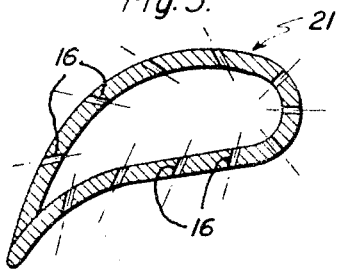
Inventor:
Paul H. Kydd,
by    *[signature]*
His Attorney.

United States Patent Office 3,457,619
Patented July 29, 1969

3,457,619
PRODUCTION OF PERFORATED METALLIC
BODIES
Paul H. Kydd, Scotia, N.Y., assignor to General Electric
Company, a corporation of New York
Filed Nov. 28, 1967, Ser. No. 686,145
Int. Cl. B23p 15/02; B21k 3/04
U.S. Cl. 29—156.8                                    5 Claims

ABSTRACT OF THE DISCLOSURE

The production of a perforated metallic body in which the density of cylindrical perforations through the body wall and/or the direction of the axes of the various cylindrical perforations may be varied in some predetermined pattern over the surface of the body is described. In its broadest aspects the process comprises the steps of (a) stacking sheets having grooves in at least one major surface thereof, (b) bonding the sheets together into a single unit and (c) cutting transversely through the integrated sheets to prepare a perforated blank having a desired pattern and direction of holes extending therethrough. The preparation of a film-cooled gas turbine nozzle (or bucket) in which there are many holes almost normal to the surface of the nozzle at the leading edge and fewer holes at an acute angle near the trailing edge is specifically described. The preparation of the turbine nozzle involves the additional step of reverse-bending of the perforated blank to connect the far ends of the perforated blank to form the hollow nozzle shape.

BACKGROUND OF THE INVENTION

The concept of making intricate parts from stacked sheets, usually stampings, has become widely accepted in order to avoid expensive machining costs. In British Patent 763,141 (Pfeil and Graham, inventors, complete specification published Dec. 5, 1956) there is disclosed a process for the manufacture of perforated hollow metallic bodies or perforated plates wherein lamina having holes therein are stacked and then consolidated. Thereafter, the pile of lamina in the form of a hollow or solid cylinder is extruded to form the hollow body or perforated plate, respectively. The ultimate perforations exist in the initial lamina as holes or slots, which are filled with filler material that is removed after completion of the forming and machining operations exposing the filled voids. This method, however, is not readily adaptable to varying the density and angular direction of the holes in the finished body and, in addition, the holes become elongated axially of the consolidated pile, which may be a disadvantage in some constructions.

The preparation of perforated bodies is of particular importance in making provision for the "film cooling" of the surface of parts, such as gas turbine nozzles and buckets, which are exposed to high temperature gas streams. Preventing overheating of such operating components is the only practical way of retaining strength in these components during operation. In order to film cool the surfaces of the parts exposed to high temperature gas streams these surfaces are perforated with fine holes. Cooling fluid (usually air) supplied to the interior of the part emerges from these holes and passes over the adjacent surface area. Thus, the number of holes must be large with varying hole density in different portions of the surface and the size and axial direction of the holes relative to the surface is most important to assure that the cooling fluid emerging from the holes remains in contact with the surface of the parts being cooled for the greatest possible distance. Depending upon the disposition of the surface area relative to the direction of gas flow the axes of any given series of holes (which are usually drilled, circular holes) will be at a large or small angle to the surface penetrated depending upon the angularity able to provide such maximum contact between the emerging fluid and the exposed surface.

The difficulty of satisfactorily complying with all of these conditions for hole placement has necessitated an improved method of manufacture over both the time-consuming drilling of individual holes or the stacking of laminae, consolidation thereof, extruding and cold-drawing to the desired shape, such as is disclosed in the aforementioned British patent. Such improvement is provided by the process of the instant invention.

SUMMARY OF THE INVENTION

In accordance with this invention a perforated blank for the preparation of any of a variety of articles, such for example as gas turbine nozzles or buckets, combustor liners or compressor blades through the wall area of which fluid is to be ejected or withdrawn (as for film cooling or improved aerodynamic effect) is prepared by stacking sheets or lamina of high temperature alloy material having one or more grooved surfaces, bonding these alloy sheets together over their mating surfaces and cutting through the stacked sheets to the specific definition of the blank. The grooves in the sheets as stacked and consolidated would then pass through the blank, the location and angle of various series of grooves extending through the thickness of the blank so as to provide specific hole density and direction of fluid ejection in the body to be prepared from the perforated blank. In the case of a turbine blade a curved blank would be cut, bent to form the final profile and then completed using the necessary finishing operations.

This method is of particular utility in connection with the preparation of bodies having perforated walls wherein the perforations are not uniformly distributed and penetrate the wall so that sets of holes have the same angularity relative to the surface of the wall, while the various sets have axes at different angles to the surface. In addition holes, or openings, in a variety of different sizes and shapes may be easily combined into a single blank by the practice of this invention.

BRIEF DESCRIPTION OF THE DRAWING

The above characterization will be more readily appreciated as the same become better understood by reference to the following detailed description of the method of this invention, when considered in connection with the accompanying drawings:

FIG. 1 is an isometric view showing a typical sheet having grooves on one surface running along the length thereof;

FIGURE 2 is a front elevational view showing a number of stacked sheets having a variety of grooved surfaces from which a shape is to be cut;

FIG. 3 is a side elevational view of the stack of sheets shown in FIG. 2 upon which is displayed the outline of the blank to be cut from the stack after consolidation of the sheets into a unit by conventional techniques;

FIG. 4 is a three-dimensional view of the perforated blank standing alone, and

FIG. 5 is a cross-sectional view showing the wide variation in hole concentration and hole direction through the wall cut from the stack of FIGS. 2 and 3 possible with this invention, the example selected being a gas turbine bucket.

DESCRIPTION OF THE PREFERRED EMBODIMENT

By way of example, the manufacture of a gas turbine bucket equipped for film cooling is described. Depending upon the number, size, shape, vertical spacing, horizontal spacing, and angular direction of the holes a plurality of alloy sheets 11 of the proper thickness (or thicknesses) having parallel grooves 12 formed on at least one surface thereof are prepared. Grooves 12 may be easily prepared in any of a variety of shapes in cross-section. If such grooves 12 are introduced into both sides of some of sheets 11, the grooves 12 in continuous sheets may be matched. The grooves 12 in sheet 11 are shown parallel to each other and equally spaced. However, it is equally conceivable that the grooves 12 in any given sheet 12 may have other than a uniform spacing.

Next, the various sheets 12 are stacked as shown in FIG. 2 or in some other desired arrangement or pattern of slot distribution, when the stack 13 is viewed from this direction.

The openings of holes 16 in FIG. 2 are shown as semicircular, but whether the slots 12 in sheet be any of a variety of geometric shapes in cross-section, the inner surface of the holes 16 extending through stack 13 (and thereby through the black to be cut therefrom) are referred to herein as "cylindrical" in keeping with the definition of a cylinder as "the surface traced by any straight line element moving parallel to a fixed straight line and intersecting a fixed curve" (Webster's Third New Int'l. Dict., 1961, page 565, G. & C. Merriam Co.). This definition includes, but is not limited to, a cylinder of circular cross-section. The axis of a cylinder of other-than-circular cross-section may be considered as passing through the center of gravity of a body of identical shape. This term "axis" is employed for ease in describing the direction of the holes in the blank to be cut and in the completed turbine blade seen in FIG. 5 relative to the adjacent surface area.

Next, the stack of individual sheets 11 is unified by bonding the sheets together over their contacting surface areas by conventional processes such as by pressure-welding or diffusion bonding in a vacuum or hydrogen atmosphere or by brazing. In the case of brazing, a brazing metal will have been deposited over the surface of each sheet 11 by the use of electroplating techniques, for example, before the stacking thereof. In the case of bonding or brazing, the stack of sheets would be subjected to hydrogen firing under pressure.

Next, in the case of a turbine blade, cuts are made through the side of stack 10 as shown along curved trace lines a, b to produce the perforated blank 17 shown in FIG. 4. Cutting may be accomplished by conventional techniques, as for example, by sawing, electrochemical machining or ultrasonic cutting. The cutting may be in a direction perpendicular to the side face of stack 13 or, if desired, the cutting may be at a bias to the stack faces. Preferably the thickness of blank 17 will be made uniform in which case it is simple to produce a plurality of such blanks 17 from a single stack 13, however, blanks having a non-uniform thickness may be cut, if desired. Also, in cases in which the application of stress to the completed piece so dictates, perforated blank 17 would be prepared by making cuts a, b down through the top of stack 13.

In the case of a turbine blade the most severe stress imposition is radially outward from the root of the blade. For this reason the direction in which the cuts are made to produce the blank 17 is selected with the object of conserving in blank 17 the columnar strength of the slices taken from the component bonded sheets 11. Had analysis shown that the stresses to which the body to be prepared from the perforated blank would be subjected during use would be applied at 90° to the stress application for turbine blades, the perforated blank 17 would have been cut from stack 13 from top to bottom cutting across the stacking planes to conserve the columnar strength of the component bonded sheet elements for withstanding the stress application.

As may be seen from FIGS. 3 and 4 the angle at which lines a, b (and thereby non-planar faces 18, 19 of perforated blank 17) cut across the straight grooves 12 may be varied to predetermine the angles at which the various holes 16 enter and pass through perforated blank 17. The preselection of the aforementioned angularity must relate to the specific directions required in the finished body.

Thus, in the case of a turbine blade the perforated blank 17 must be bent back on itself as indicated in FIG. 4 and the far ends joined to produce the closed body, which after the conventional finishing operations emerges as turbine bucket 21 shown in FIG. 5. Therein, it may be readily seen that a varying preselected density of holes and direction of hole axes has produced an optimized film-cooled blade structure.

Therefore, although the construction of a turbine blade equipped for film cooling thereof has been described in detail the preselectability of the various parameters such as the number, size, shape, vertical spacing, horizontal spacing and angularity of the holes relative to the body being produced, as well as the thickness, direction of and angle of cut through the stacked bonded sheets all make the method disclosed herein applicable to the preparation of other bodies having perforated walls within the scope of the appended claims.

What I claim as new and desire to secure by Letters Patent of the United States is:

1. In a process for making a perforated body in which a plurality of holes pass in a parallel direction completely through said body, the steps comprising:
   (a) stacking a plurality of flat laminae at least some of which have a plurality of parallel grooves formed in at least one face thereof,
   (b) consolidating said plurality of laminae into a uniform mass having a plurality of parallel holes extending therethrough by bonding together the contiguous flat surfaces,
   (c) cutting completely through the said unified mass transverse to the direction of said holes and subdividing said unified mass into two portions each of which is left with a first surface traced by a single line element moving parallel to some predetermined straight line, and
   (d) cutting completely through one of said two portions transverse to the direction of said holes further subdividing said one portion to produce a perforated body defined in part by said first surface and in part by a second surface spaced from said first surface.

2. The process for making a perforated body substantially as recited in claim 1 wherein the perforated body is formed into a hollow body having a perforated wall by joining two opposite sides thereof.

3. In a process for making a perforated body in which a plurality of sets of cylindrical holes pass in a mutually parallel direction completely through said body venting at opposite surfaces thereof, at least some of said sets of holes pass through said body at angels to one of said surfaces which when determined in a similar manner, differ from the angularity of others of said sets, and the population density of said holes vary in different portions of said wall, the steps comprising:
   (a) stacking a plurality of thin flat sheets at least some of which have a plurality of parallel grooves formed in at least one face thereof,
   (b) consolidating said plurality of sheets into a unified mass having a plurality of parallel holes extending therethrough by bonding together the contiguous flat surfaces,
   (c) cutting completely through said unified mass transverse to the direction of said holes and subdividing said unified mass into two portions each of which is left with a first non-planar surface traced by a single line element moving parallel to some predetermined straight line, and (d) cutting completely through one of said two portions transverse to the direction of said holes further subdividing said one portion to produce a perforated body defined in part by said first surface and in part by a second non-planar surface spaced from said first surface.

4. The process for making a perforated body substantially as recited in claim 3 wherein the perforated body is formed into a hollow body having a perforated wall by joining two opposite sides thereof.

5. A process for preparing a hollow turbine blade having perforations for film cooling of the outer blade surface comprising the steps of:
  (a) stacking a plurality of thin flat sheets at least some of which have a plurality of parallel grooves formed in at least one face thereof,
  (b) consolidating said plurality of sheets into a unified mass having a plurality of cylindrical parallel holes extending therethrough by bonding together the contiguous flat surfaces,
  (c) cutting completely through said unified mass transverse to the direction of said holes and subdividing said unified mass into two portions each of which is left with a first curved surface traced by a single line element moving parallel to a first predetermined straight line,
  (d) cutting completely through one of said two portions transverse to the direction of said holes further subdividing said one portion to produce a perforated wall defined in part by said first surface and in part by a second curved surface spaced from said first surface and traced by a single line element moving parallel to a second predetermined straight line,
  (e) bending said perforated wall to reverse the curvature thereof and place the far ends thereof adjacent each other, and
  (f) bonding said far ends together.

References Cited

UNITED STATES PATENTS

| | | | |
|---|---|---|---|
| 730,363 | 6/1903 | Geisenhöner | 253—77 |
| 2,963,269 | 12/1960 | Gerdan et al. | 29—156.8 X |
| 3,419,952 | 1/1969 | Carlson | 29—472.3 X |

FOREIGN PATENTS 763,141   12/1956   Great Britain.

JOHN F. CAMPBELL, Primary Examiner

D. C. REILEY, Assistant Examiner

U.S. Cl. X.R.

29—163.5, 472.3; 113—116